(12) United States Patent
Goldman et al.

(10) Patent No.: US 8,953,625 B2
(45) Date of Patent: *Feb. 10, 2015

(54) APPLYING BACKPRESSURE TO A SUBSET OF NODES IN A DEFICIT WEIGHTED ROUND ROBIN SCHEDULER

(71) Applicant: Juniper Networks, Inc., Sunnyvale, CA (US)

(72) Inventors: Gary Goldman, Los Altos, CA (US); Srihari Vegesna, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/874,042

(22) Filed: Apr. 30, 2013

(65) Prior Publication Data

US 2013/0235880 A1 Sep. 12, 2013

Related U.S. Application Data

(63) Continuation of application No. 13/030,694, filed on Feb. 18, 2011, now Pat. No. 8,457,142.

(51) Int. Cl.
*H04L 12/867* (2013.01)
*H04L 12/825* (2013.01)

(52) U.S. Cl.
CPC ............. *H04L 47/629* (2013.01); *H04L 47/266* (2013.01)
USPC ......................................... 370/408; 370/412

(58) Field of Classification Search
USPC .................................................. 370/408, 412
See application file for complete search history.

(56) References Cited

U.S. PATENT DOCUMENTS

| 7,995,597 | B2 | 8/2011 | Venables |
| 2005/0141424 | A1 | 6/2005 | Lim et al. |
| 2007/0070895 | A1 | 3/2007 | Narvaez |
| 2009/0279435 | A1 | 11/2009 | Du et al. |
| 2011/0085464 | A1 | 4/2011 | Nordmark et al. |

OTHER PUBLICATIONS

Co-pending U.S. Appl. No. 13/030,694, filed Feb. 18, 2011 entitled "Applying Backpressure to a subset of Nodes in a Deficit Weighted Round Robin Scheduler" by Goldman et al., 63 pages.

*Primary Examiner* — Dang Ton
*Assistant Examiner* — Mewale Ambaye
(74) *Attorney, Agent, or Firm* — Harrity & Harrity, LLP

(57) ABSTRACT

A scheduler in a network element may include a dequeuer to dequeue packets from a set of scheduling nodes using a deficit weighted round robin process, where the dequeuer is to determine whether a subset of the set of scheduling nodes is being backpressured. The dequeuer may set a root rich most negative credits (MNC) value, associated with a root node, to a root poor MNC value, associated with the root node, and set the root poor MNC value to zero, when the subset is not being backpressured, and may set the rich MNC value to a maximum of the root poor MNC value and a root backpressured rich MNC value, associated with the subset, and set the root poor MNC value to a root backpressured poor MNC value, associated with the subset, when the subset is being backpressured.

20 Claims, 11 Drawing Sheets

US 8,953,625 B2

APPLYING BACKPRESSURE TO A SUBSET OF NODES IN A DEFICIT WEIGHTED ROUND ROBIN SCHEDULER

RELATED APPLICATION

This application is a continuation of U.S. patent application Ser. No. 13/030,694, filed Feb. 18, 2011, the disclosure of which is incorporated herein by reference.

BACKGROUND

Networks typically include network elements, such as routers, switches, or gateways, which transfer or switch data from one or more sources to one or more destinations. A network element may process data units. For example, the network element may receive a data unit from a source device (or another network element), may determine a destination for the data unit, and may send an original or a modified data unit to a destination device (or another network element).

A packet is one type of data unit in which encapsulated data can be transmitted through a network and which may vary in size. A network element may receive packets from a large number of sources and may therefore handle a large number of packet streams. As the network element has limited resources, the network element may need to allocate resources among the large number of packet streams. For example, the network element may need to store particular packet streams in queues and may need to schedule the queues in a fair manner. One example of a fair queueing process is a round robin process, which removes one packet at a time from each queue in a round robin fashion. However, packets may vary greatly in size (e.g., length of packets in number of bytes), and a first queue that includes large packets may receive an unfair share of resources in comparison to a second queue that includes smaller packets.

One improvement of the round robin process is a deficit round robin process. In a deficit round robin process, particular queues are assigned a number of credits for a particular round, and when a packet is removed from a queue, the size of the packet is subtracted from the credits. When removing another packet would reduce the queue's credits to zero, the process moves to a next queue in the round robin process. While a deficit round robin process may take into account packet size, a particular queue may nevertheless consume more than a fair share of network element resources. Thus, distributing resources of a network element among queues in a fair manner may prove to be quite challenging.

SUMMARY OF THE INVENTION

According to one aspect, a scheduler in a network device may include a dequeuer to dequeue packets from a set of scheduling nodes using a deficit weighted round robin process, where the dequeuer may determine whether a subset of the set of scheduling nodes is being backpressured, where when a scheduling node is included in the subset, the scheduling node does not participate in the deficit weighted round robin (DWRR) process; set a root rich most negative credits (MNC) value, associated with a root node, to a root poor MNC value, associated with the root node, and set the root poor MNC value to zero, when the subset is not being backpressured; set the rich MNC value to a maximum of the root poor MNC value and a root backpressured rich MNC value, associated with the subset, and set the root poor MNC value to a root backpressured poor MNC value, associated with the subset, when the subset is being backpressured; where the root rich MNC value corresponds to a measure of how many credits will replenish scheduling nodes to a nonnegative value of credits, based on a previous DWRR round; where the root poor MNC value corresponds to a measure of how many credits will replenish scheduling nodes to a nonnegative value of credits, based on a current DWRR round; where the root backpressured rich MNC value corresponds to a measure of how many credits will replenish scheduling nodes in the subset to a nonnegative value of credits, based on a previous DWRR round; and where the root backpressured poor MNC value corresponds to a measure of how many credits will replenish scheduling nodes in the subset to a nonnegative value of credits, based on a current DWRR round.

According to another aspect, a method performed by a network device, may include performing, by the network device, a dequeueing process on a set of scheduling nodes using a deficit weighted round robin (DWRR) process; determining, by the network device, whether a subset of the set of scheduling nodes is being backpressured, where when a scheduling node is included in the subset, the scheduling node does not participate in the deficit weighted round robin process; setting, by the network device, a root rich MNC value, associated with a root node, to a root poor MNC value, associated with the root node, and set the root poor MNC value to zero, when the subset is not being backpressured; setting, by the network device, the rich MNC value to a maximum of the root poor MNC value and a root backpressured rich MNC value, associated with the subset, and set the root poor MNC value to a root backpressured poor MNC value, associated with the subset, when the subset is being backpressured; where the root rich MNC value corresponds to a measure of how many credits will replenish scheduling nodes to a nonnegative value of credits, based on a previous DWRR round; where the root poor MNC value corresponds to a measure of how many credits will replenish scheduling nodes to a nonnegative value of credits, based on a current DWRR round; where the root backpressured rich MNC value corresponds to a measure of how many credits will replenish scheduling nodes in the subset to a nonnegative value of credits, based on a previous DWRR round; and where the root backpressured poor MNC value corresponds to a measure of how many credits will replenish scheduling nodes in the subset to a nonnegative value of credits, based on a current DWRR round According to yet another aspect, a computer-readable medium storing instructions executable by a processor, may include one or more instructions to perform a dequeueing process on a set of scheduling nodes using a deficit weighted round robin (DWRR) process; one or more instructions to determine whether to a subset of the set of scheduling nodes is being backpressured, where when a scheduling node is included in the subset, the scheduling node does not participate in the deficit weighted round robin process; one or more instructions to set a root rich MNC value, associated with a root node, to a root poor MNC value, associated with the root node, and set the root poor MNC value to zero, when the subset is not being backpressured; one or more instructions to set the rich MNC value to a maximum of the root poor MNC value and a root backpressured rich MNC value, associated with the subset, and set the root poor MNC value to a root backpressured poor MNC value, associated with the subset, when the subset is being backpressured; where the root rich MNC value corresponds to a measure of how many credits will replenish scheduling nodes to a nonnegative value of credits, based on a previous DWRR round; where the root poor MNC value corresponds to a measure of how many credits will replenish scheduling nodes to a nonnegative value of credits, based on a current DWRR round; where the root backpressured rich MNC value corresponds to a measure of how many credits will replenish scheduling nodes in the subset to a nonnegative value of credits, based on a previous DWRR round; and where the root backpressured poor MNC value corresponds to a measure of how many credits will replenish scheduling nodes in the subset to a nonnegative value of credits, based on a current DWRR round

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

Figure 1:
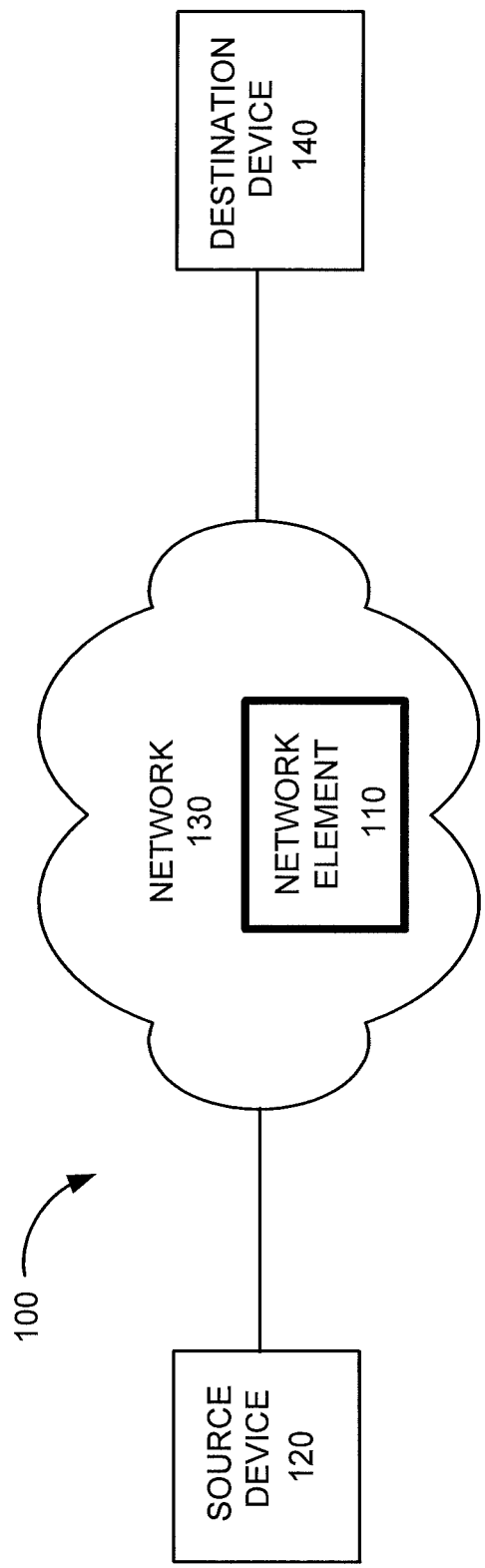
FIG. 1 is a diagram illustrating an example system according to an implementation described herein.

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

An implementation described herein may relate to applying backpressure to a subset of scheduling nodes in a deficit weighted round robin scheduling policy with multiple scheduling levels. The scheduling nodes may include a hierarchy of scheduling nodes, where a particular level of the hierarchy includes nodes that points to one or more child nodes of a lower level of the hierarchy, and where the lowest level of the hierarchy includes queue nodes that store data to be processed. Thus, scheduling node may correspond to a queue node or to a group of queues organized together into a higher level node. For example, in a three level scheduling hierarchy, queue nodes may be grouped into stream nodes and stream nodes may be grouped into a root node.

Applying backpressure to a subset of nodes may refer to temporarily disabling the subset of nodes by stopping the flow of data traffic stored in a node. For example, applying backpressure to a queue node may include ceasing to dequeue packets from the queue node while the backpressure is applied. Backpressure may be applied to a subset of scheduling nodes based on detecting a trigger condition. The trigger condition may include, for example, detecting that use of a particular resource associated with the subset of scheduling nodes has exceeded a threshold, detecting that a total amount of resources used by the subset of scheduling nodes has exceeded a threshold, and/or receiving a request to apply backpressure to the subset of scheduling nodes.

A deficit weighted round robin (DWRR) scheduling policy may apply weight credits to a particular scheduling node based on a weight associated with the scheduling node. The weight may be based, for example, on a bandwidth associated with the node. Thus, during a particular scheduling round, scheduling nodes are assigned weight credits and, when a packet is dequeued from a particular scheduling node, the size of the packet is subtracted from the assigned weight credits. In a particular round, packets may be dequeued from a particular scheduling node until the weight credits of the particular scheduling node reach a negative number. When weight credits of all participating scheduling nodes reach a negative number, a new round may begin. During the new round, weight credits are again assigned to a particular scheduling node before packets are dequeued from the particular scheduling node.

If a single scheduling node is backpressured, the weight credits of the backpressured scheduling node may be cleared, as they would become stale as the other nodes continue to participate in the DWRR process. However, if a subset of scheduling nodes is backpressured, it may not be possible to simply clear the weight credits of the backpressured scheduling nodes, as doing so would violate the DWRR bandwidth distribution among the subset of scheduling nodes. Thus, once backpressure is released from the subset of scheduling nodes, the desired DWRR bandwidth distribution would not be achieved.

An implementation described herein may relate to freezing weight credits of scheduling nodes in a backpressured subset of scheduling nodes. When the backpressure is released, the scheduling nodes will continue to be scheduled where they left off in the DWRR process when the backpressure was applied. A scheduler may add new variables associated with a root scheduling node. The scheduler may add a root backpressure flag that indicates that backpressure is being applied to a subset of scheduling nodes. As described further herein, the scheduler may also add a root backpressured rich most negative credits variable and a root backpressured poor most negative credits variable.

Most negative credits (MNC), associated with a particular scheduling node, may refer to a value that is calculated during each round of the DWRR process and may be based on a smallest value that would bring all immediate children scheduling nodes of the particular scheduling node back to a nonnegative value of weight credits. For example, assume queue 1 has a weight of 2, queue 2 has a weight of 5, and queue 3 has a weight of 10, and assume that, at the end of a DWRR scheduling round, queue 1 ends up with −100 weight credits, queue 2 ends up with −50 weight credits, and queue 3 ends up with −400 weight credits. To bring queue 1 up to nonnegative weight credits would require 50 weight credits (50*2=100), to bring queue 2 up to nonnegative weight credits would require 10 weight credits (10*5=50), and to bring queue 3 up to nonnegative weight credits would require 40 weight credits (40*10=400). Thus, in this case, MNC may correspond to 50 weight credits, as 50 weight credits would take queue 1 to 0 weight credits (50*2+−50=0), queue 2 to 200 weight credits (50*5+−50=200), and queue 3 to 100 weight credits (50*10+−400=100). The MNC may be multiplied by the weight of each queue to determine how many weight credits each queue receives during the next DWRR scheduling round. In this example, given the MNC of 50, queue 1 would receive 100 weight credits and end up with 0 credits (50*2+−100=0), queue 2 would receive 250 weight credits and end up with 200 credits (50*5+−50=200), and queue 3 would receive 500 weight credits and end up with 100 weigh credits (50*10+−400=100).

Each scheduling level may be associated with a rich MNC variable and a poor MNC variable. A scheduling node may be referred to as rich if the scheduling node is associated with nonnegative weight credits and as poor if the scheduling node is associated with negative weight credits. Thus, if the scheduling node depletes its weight credits, the scheduling node may be moved from a rich list to a poor list. When a scheduling node is moved from the rich list to the poor list, a poor MNC value may be recomputed based on the negative credits of the node. When the rich list becomes empty, a new DWRR scheduling round may begin. When the new DWRR scheduling round begins, the poor MNC value may be swapped into a rich MNC value, and the poor MNC value may be cleared. Thus, the rich MNC value may be used during a particular DWRR scheduling round to compute how many credits to add to a scheduling node based on the negative credits from the previous round, while the poor MNC value may be used during the particular DWRR scheduling round to keep track of the negative credits in the current round and may be used to determine the rich MNC value for the next round.

The root node may be associated with a root rich MNC variable, a root poor MNC variable, a root backpressured (BP) rich MNC variable, and a root BP poor MNC variable. When a new DWRR scheduling round begins, if backpressure is not applied to a subset of scheduling nodes, based on a root BP flag not being set, the root poor MNC value may be swapped into the root rich MNC value and the root poor MNC value may be cleared, and the root BP poor MNC value may also be swapped into the root BP rich MNC value and the root BP poor MNC value may be cleared. However, if backpressure is applied to a subset of scheduling nodes, based on the BP flag being set, the root rich MNC value is set to a maximum of the root poor MNC value and the root BP rich MNC value, and the root poor MNC value is set to root BP poor MNC value. Thus, if a new DWRR scheduling round begins:
if root BP flag=false:
root rich MNC=root poor MNC,
root poor MNC=0,
root BP rich MNC=root BP poor MNC,
root BP poor MNC=0, and
if root BP flag=true:
root rich MNC=MAX(root poor MNC, root BP rich MNC),
root poor MNC=root BP poor MNC.

The root rich MNC value may be thought of as corresponding to a measure of how many credits will replenish scheduling nodes to a nonnegative value of credits, based on a previous DWRR round; the root poor MNC value may be thought of as corresponding to a measure of how many credits will replenish scheduling nodes to a nonnegative value of credits, based on a current DWRR round; the root backpressured rich MNC value may be thought of as corresponding to a measure of how many credits will replenish scheduling nodes, in a subset of scheduling nodes that may be subject to applied backpressure, to a nonnegative value of credits, based on a previous DWRR round; and the root backpressured poor MNC value may be thought of as corresponding to a measure of how many credits will replenish scheduling nodes, in a subset of scheduling nodes that may be subject to applied backpressure, based on a current DWRR round Setting the root rich MNC value to a maximum of the root poor MNC value and the root BP rich MNC value, when backpressure is applied to a subset of scheduling nodes, may preserve a minimum value of a rich MNC for the backpressured subset of scheduling nodes which are currently rich but which have not yet had credits replenished in the DWRR scheduling process. Setting the root poor MNC value to root BP poor MNC value, when backpressure is applied to a subset of scheduling nodes, may preserve a minimum value of poor MNC for the backpressured subset of scheduling nodes which are currently poor. These operations may be necessary so that when the backpressured subset of scheduling nodes is subsequently released and re-enters the DWRR scheduling process, the MNC value will be sufficient to guarantee that the nodes from the backpressured subset will have nonnegative weight credits upon their next weigh credit replenishment.

An implementation described herein may further apply a priority to a particular scheduling level and may associate a particular priority with particular nodes of the particular scheduling level. A DWRR scheduling process may be applied to nodes based on a particular priority associated with the scheduling nodes. Moreover, a priority level may be used when applying backpressure to a subset of scheduling nodes. For example, in one implementation, backpressure may be applied to nodes associated with a particular priority. In another implementation, a subset of scheduling nodes, which is to be backpressured, may be selected by another technique.

FIG. 1 is a diagram illustrating an example system 100 according to an implementation described herein. As shown in FIG. 1, system 100 may include one or more network elements 110 (referred to herein individually as "network element 110" and collectively as "network elements 110"), a source device 120, a network 130, and a destination device 140. Source device 120 may send packets to destination device 140 through network 130 via network element 110. While a single network element 110 is illustrated in FIG. 1 for simplicity, network 130 may include many network elements 110 and a route traveled by packets from source device 120 to destination device 140 may include multiple, and possibly a large number of, network elements 110.

Network element 110 may include any device that receives and transmits packets within a network or between networks. Network element 110 may include, for example, a gateway, a router, a switch, a firewall, a network interface card (NIC), a hub, a bridge, a proxy server, an optical add-drop multiplexer (OADM), or some other type of device (e.g., a layer 2 and/or layer 3 device) that processes and/or transfers traffic. Network element 110 may include one or more ingress interfaces and one or more egress interfaces. Network element 110 may receive a packet at one of the ingress interfaces, determine a destination of the received packet, determine an egress interface based on the determined destination, and forward the packet via the determined egress interface. Additionally, network element 110 may determine whether to forward the received packet or whether to drop the received packet.

Source device 120 and destination device 140 may include a same type of device or different types of devices. For example, source device 120 and destination device 140 may include any device with a communication function, such as a personal computer or workstation, a server device, a portable computer, a voice over Internet Protocol (VoIP) telephone device, a radiotelephone, a portable communication device (e.g. a mobile phone, a global positioning system (GPS) device, or another type of wireless device), a content recording device (e.g., a camera, a video camera, etc.), a gaming system, an access point base station, a cellular base station, and/or any type of network element encompassed by network element 110.

Network 130 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of these networks or other types of networks.

Although FIG. 1 shows example components of system 100, in other implementations, system 100 may include fewer components, different components, differently arranged components, and/or additional components than depicted in FIG. 1. Additionally or alternatively, one or more components of system 100 may perform one or more tasks described as being performed by one or more other components of system 100.

Figure 2:
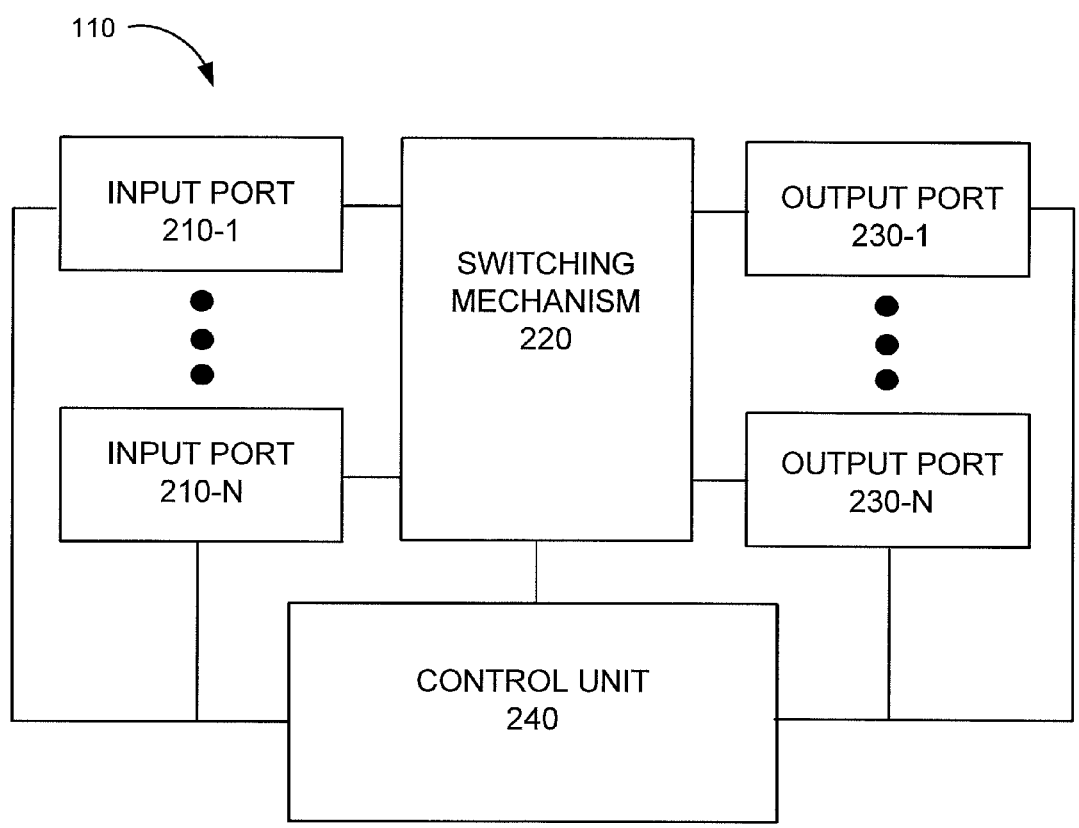
FIG. 2 is a diagram illustrating example components of a network device of the system of FIG. 1 according to an implementation described herein.

FIG. 2 is a diagram illustrating example components of network device 110 of the system of FIG. 1 according to an implementation described herein. As shown in FIG. 2, network device 110 may include may include one or more input ports 210-1 to 210-N (referred to herein individually as "input port 210" and collectively as "input ports 210"), a switching mechanism 220, one or more output ports 230-1 to 230-N (referred to herein individually as "output port 230" and collectively as "output ports 230"), and/or a control unit 340.

Input ports 210 may be the points of attachments for physical links and may be the points of entry for incoming traffic. An input port 210 may be associated with an interface card (not shown in FIG. 2). Switching mechanism 220 may include one or more switching planes to facilitate communication between input ports 210 and output ports 230. In one implementation, each of the switching planes may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card (not shown in FIG. 2). Control unit 240 may interconnect with input ports 210, switching mechanism 220, and/or output ports 230 and may control operation of network element 110. For example, if network element corresponds to a router, control unit 240 may perform control plane operations associated with network element 110 (e.g., control unit 240 may use routing protocols and may create a forwarding table that is used in traffic forwarding).

Although FIG. 2 shows example components of network element 110, in other implementations, network element 110 may include fewer components, different components, differently arranged components, and/or additional components than depicted in FIG. 2. Additionally or alternatively, one or more components of network element 110 may perform one or more tasks described as being performed by one or more other components of network element 110.

Figure 3:
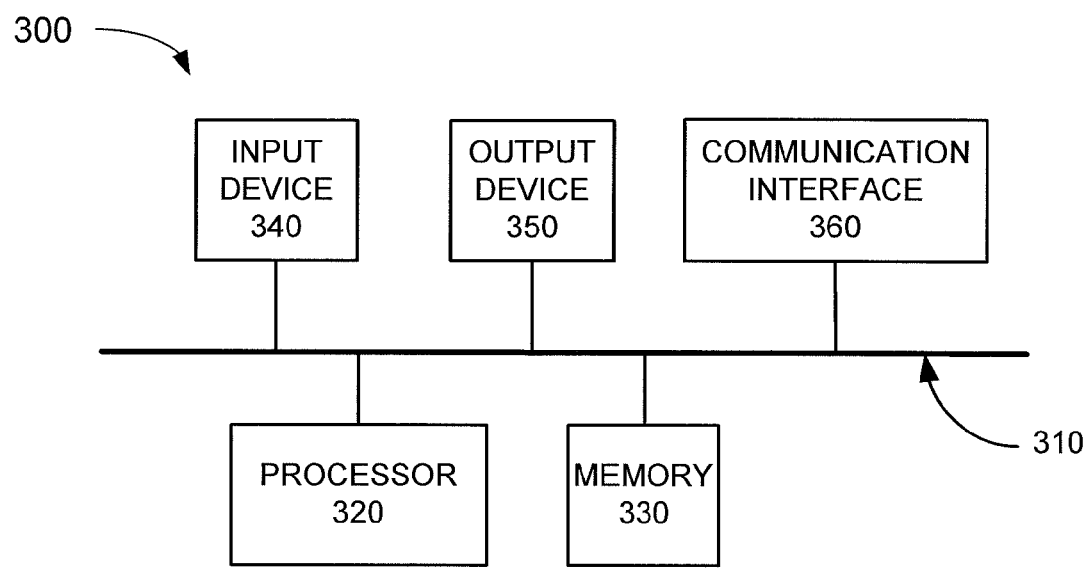
FIG. 3 is a diagram illustrating example components of a device that corresponds to one of the components of FIG. 2 according to an implementation described herein.

FIG. 3 is a diagram illustrating example components of a device 300 according to a first implementation described herein. In one implementation, device 300 may correspond to one or more of the components of network element 110, such as input port 210, switching mechanism 220, output port 230, and/or control unit 240. For example, each of input port 210, switching mechanism 220, output port 230, and/or control unit 240 may include one or more devices 300. In another implementation, device 300 may correspond only to control unit 240. As shown in FIG. 3, device 300 may include a bus 310, a processor 320, a memory 330, an input device 340, an output device 350, and a communication interface 360.

Bus 310 may include a path that permits communication among the components of device 300. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to device 300, such as a keypad, a button, a pen, a touch screen, voice recognition and/or biometric mechanisms, etc. Output device 350 may include a mechanism that outputs information to the operator, including one or more light indicators, a display, a speaker, etc.

Communication interface 360 may include any transceiver-like mechanism that enables device 300 to communicate with other devices and/or systems. For example, communication interface 360 may include a modem, a network interface card, and/or a wireless interface card.

As will be described in detail below, device 300 may perform certain operations. Device 300 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, additional components, or differently arranged components than depicted in FIG. 3. Additionally or alternatively, one or more components of device 300 may perform one or more tasks described as being performed by one or more other components of device 300.

Figure 4:
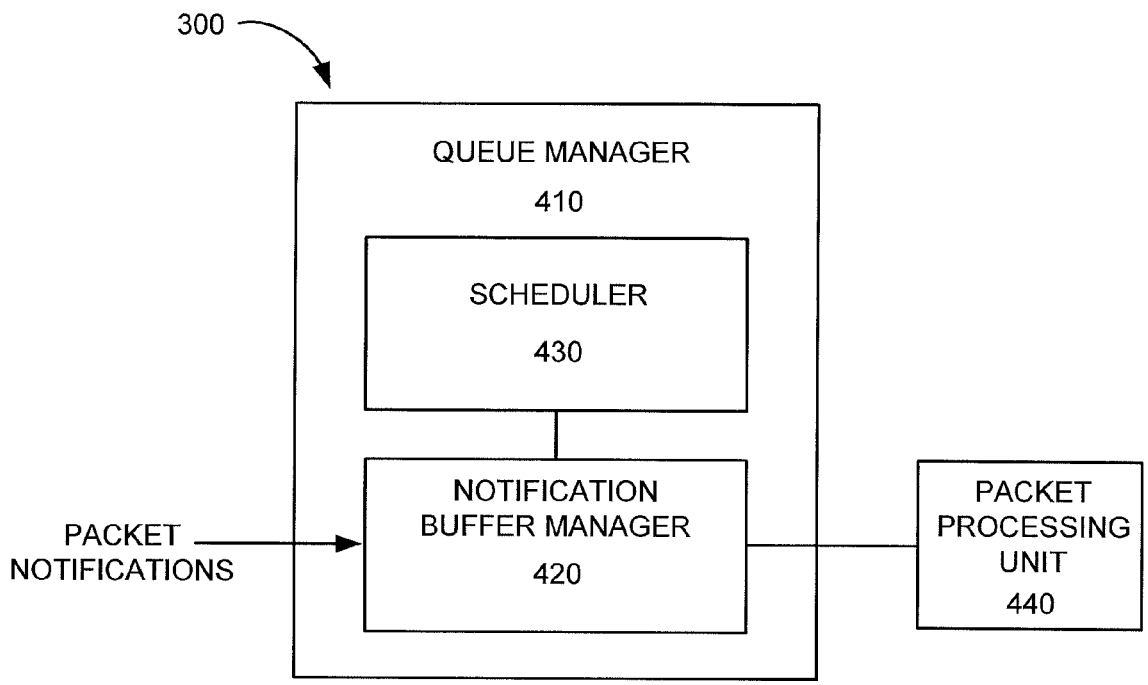
FIG. 4 is a first diagram illustrating example functional components of a device according to an implementation described herein.

FIG. 4 is a first diagram illustrating example functional components of device 300 according to an implementation described herein. As shown in FIG. 4, device 300 may include a queue manager 410 and a packet processing unit 440.

Queue manager 410 may include a notification buffer manager 420 and a scheduler 430. Notification buffer manager 420 may manage a pool of memory used to store packets notifications while the packet notifications are enqueued by scheduler 430. When a packet notification is selected for enqueueing, notification buffer manager 420 may allocate a notification buffer pointer to a selected memory location, may write the packet notification to the selected memory location, and may forward the notification buffer pointer to scheduler 430. When the packet notification is dequeued, scheduler 430 may send the notification buffer pointer to notification buffer manager 420 and notification buffer manager 420 may read the notification from memory, may deallocate the notification buffer pointer, and may forward the packet notification to packet processing unit 440. Notification buffer manager 420 may also send a read request to a data buffer manager (not shown in FIG. 2), which may store the packet associated with the packet notification, to fetch some or all of the packet, and may forward the fetched packet or portion of the packet to packet processing unit 440. The packet notification may include, for example, an input queue number associated with the queue into which the packet notification was enqueued, a length of the packet associated with the packet notification, and/or one or more pointers to packet data memory locations.

Scheduler 430 may receive packet notifications from notification buffer manager 420 and may enqueue the packet notification into a particular queue. Scheduler 430 may then schedule the packet notification for dequeueing based on a DWRR process and may dequeue the packet notification based on the schedule. When the packet notification is dequeued, scheduler 430 may return the packet notification to notification buffer manager 420 to forward the packet notification to packet processing unit 440. Example functional components of scheduler 430 are described below with reference to FIG. 5.

Packet processing unit 440 may receive a packet notification from notification buffer manager 420 and may perform one or more processing steps on a packet associated with the received packet notification. Packet processing unit 440 may include, for example, a look up engine that performs a look up process for the packet (e.g., may look up a destination for the packet in a forwarding table); a switching fabric (e.g., switching mechanism 220) that forwards the packet towards an output port; output port 230 that forward the packet to another network element; another processor associated with network element 110; and/or any other component associated with network element 110 that may perform a processing step associated with the packet based on a schedule, such as, an encapsulation or decapsulation process, an encryption or decryption process, an authentication process, an enqueueing process, and/or any other process performed by network element 110.

Although FIG. 4 shows example functional components of device 300, in other implementations, device 300 may include fewer functional components, different functional components, differently arranged functional components, and/or additional functional components than depicted in FIG. 4. Additionally or alternatively, one or more functional components of device 300 shown in FIG. 4 may perform one or more tasks described as being performed by one or more other functional components of device 300 shown in FIG. 4.

Figure 5:
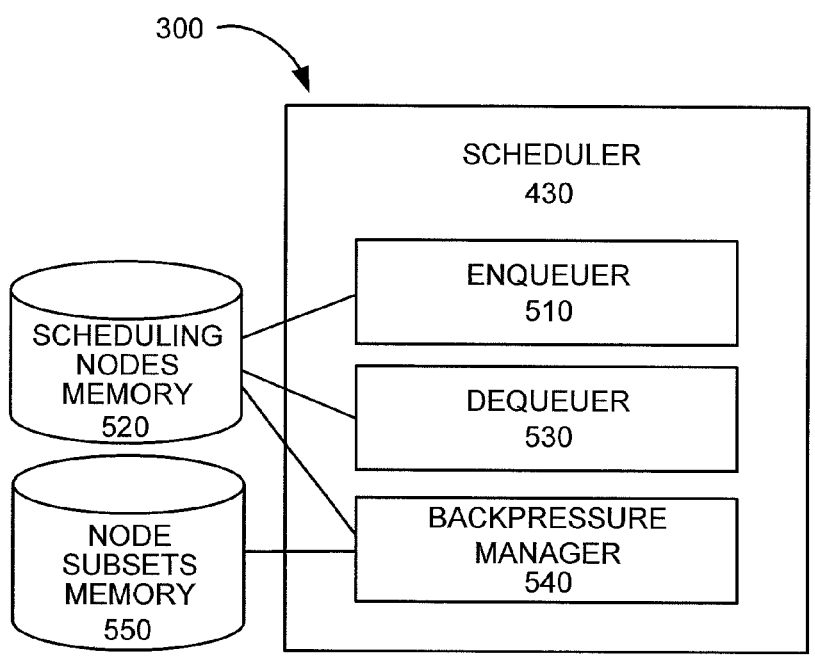
FIG. 5 is a second diagram illustrating example functional components of a device according to an implementation described herein.

FIG. 5 is a second diagram illustrating example functional components of device 300 according to an implementation described herein. FIG. 5 illustrates functional components of scheduler 430 and a relationship of scheduler 430 to one or more memories (e.g., memory 330). As shown in FIG. 5, device 300 may include scheduler 430, a scheduling nodes memory 520, and a node subsets memory 550.

Scheduler 430 may include an enqueuer 510, a dequeuer 530, and a backpressure manager 540. Enqueuer 510 may receive a packet notification (e.g., from notification buffer manager 420), may select a particular queue from scheduling nodes memory 520 in which to store the packet notification, and may store the packet notification in the selected queue.

Dequeuer 530 may dequeue packet notifications from queues based on a DWRR process. For example, dequeuer 530 may find an eligible scheduling node from a rich list, select a scheduling node, pop a packet notification from the selected queue, decrease the weight credits associated with the selected queue based on a size of the packet associated with the popped packet notification. Dequeuer 530 may continue to pop packet notifications until the weight credits associated with the selected queue reach a negative value, at which point dequeuer 530 may update a poor MNC value associated with the scheduling level. When the rich list becomes empty, dequeuer 530 may swap a poor MNC value into a reach MNC value to determine how many credits are to be given to scheduling nodes, and may set the poor MNC value to zero.

While a single dequeuer 530 is illustrated in FIG. 5 for simplicity, multiple instances of dequeuer 530 may be running at any particular time. An instance of dequeuer 530 may operate independently at each particular scheduling node by using the DWRR process to select among the children nodes of the particular scheduling node. For example, an instance of dequeuer 530 at a root node may select a child node of the root node (e.g., a stream node) via the DWRR process, then an instance of dequeuer 530 at the selected stream node may select, via the DWRR process, a child node of the selected stream node (e.g., a queue node). The next time the instance of dequeuer 530 at the root node makes a selection, the root node dequeuer 530 may select the same stream node or a different stream node as during the previous selection, and an instance of dequeuer 530 at the newly selected stream node may select a queue node from among the children of the newly selected stream node.

At the root node, if backpressure is not applied to a subset of scheduling nodes, dequeuer 530 may swap a root poor MNC value into a root rich MNC value, may clear the root poor MNC value, may swap a root BP poor MNC value into a root BP rich MNC value, and may clear the root BP poor MNC. If backpressure is applied to a subset of scheduling nodes, dequeuer 530 may set the root rich MNC value to a maximum of the root poor MNC value and the root BP rich MNC value, and may set the root poor MNC value to the root BP poor MNC value.

Backpressure manager 540 may apply backpressure to a subset of scheduling nodes when one or more trigger conditions is detected and may stop applying backpressure to the subset of scheduling nodes when the one or more trigger conditions are no longer satisfied. For example, backpressure manager 540 may access node subsets memory 550 to determine resources associated with a particular subset of queues and to determine whether the particular subset of queues is using an amount of a particular resource greater than a threshold. Examples of particular resources the use of which may be monitored and stored in node subsets memory 550 are described below with reference to FIG. 7B. If backpressure manager 540 determines that a particular queue or group of queues is using up too much of a particular resource, backpressure manager may apply backpressure to the particular queue or group of queues. Backpressure manager 540 may remove the applied backpressure after a particular time interval, after a particular number of DWRR scheduling rounds have elapsed, based on detecting that an amount of a particular resource that is available has become greater than a threshold, and/or based on detecting that use of a particular resource associated with the particular queue or group of queues has fallen below a threshold. Backpressure manager 540 may update a backpressure subset list associated with a root node when backpressure manager 540 determines that a particular scheduling node is to be backpressured.

Scheduling nodes memory 520 may store scheduling nodes associated with scheduler 430. Scheduling nodes memory 520 is described below with reference to FIG. 6 and FIG. 7A.

Node subsets memory 550 may store information about particular subsets of scheduling nodes stored in scheduling nodes memory 520. Node subsets memory 550 is described below with reference to FIG. 7B.

Although FIG. 5 shows example functional components of device 300, in other implementations, device 300 may include fewer functional components, different functional components, differently arranged functional components, and/or additional functional components than depicted in FIG. 5. Additionally or alternatively, one or more functional components of device 300 shown in FIG. 5 may perform one or more tasks described as being performed by one or more other functional components of device 300 shown in FIG. 5.

Figure 6:
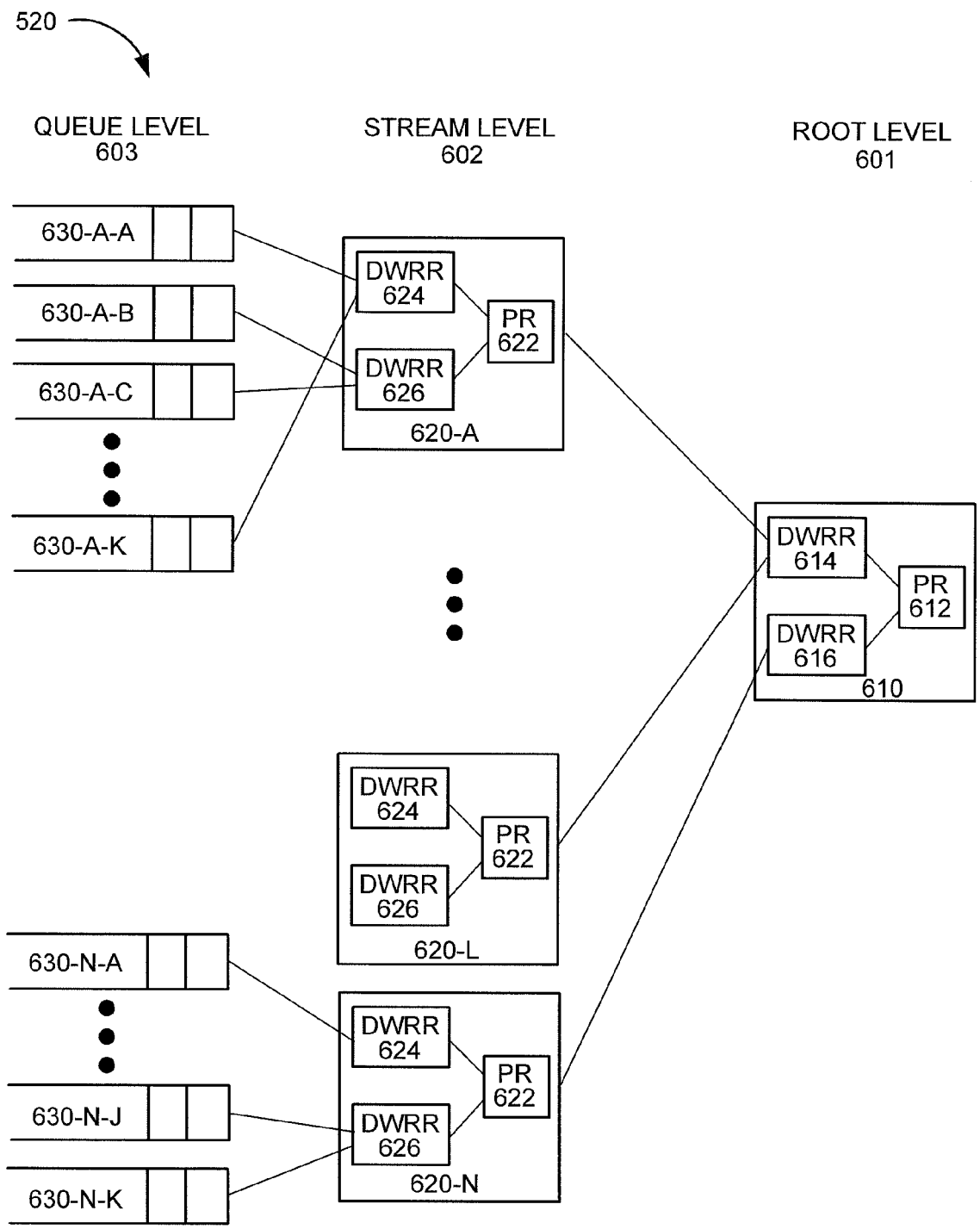
FIG. 6 is a diagram illustrating an example scheduling node hierarchy according to an implementation described herein.

FIG. 6 is a diagram illustrating an example scheduling node hierarchy associated with scheduling nodes memory 520 according to an implementation described herein. FIG. 6 illustrates how a DWRR process may be applied to scheduling nodes in a hierarchy with multiple scheduling levels and multiple priority levels. As shown in FIG. 6, in one implementation, scheduling nodes memory 520 may include a scheduling hierarchy with three scheduling levels and two priority levels. In another implementation, scheduling nodes memory 520 may include additional, or fewer, hierarchy levels and/or additional, or fewer, priority levels. In the example illustrate in FIG. 6, scheduling nodes memory 520 may include a root level 601, a stream level 602, and a queue level 603.

Root level 601 may include a single root node 610. Root node 610 may include a priority selection mechanism 612, a high priority set of DWRR pointers 614, and a low priority set of DWRR pointers 616. In one implementation, priority selection mechanism 612 may be implemented as one or more bitmasks. In another implementation, priority selection mechanism 612 may be implemented using another technique. High priority set of DWRR pointers 614 may point to stream level nodes associated with a high priority. Low priority set of DWRR pointers 616 may point to stream level nodes associated with a low priority.

Stream level 602 may include one or more stream nodes 620 (referred to herein collectively as "stream nodes 620" and individually as "stream node 620"). For example, as shown in FIG. 6, stream level 620 may include stream nodes 620-A to 620-N. In the example of FIG. 6, stream nodes 620-A and 620-L are associated with a high priority and stream node 620-N is associated with a low priority. Stream node 620 may include a priority selection mechanism 622, a high priority set of DWRR pointers 624, and a low priority set of DWRR pointers 626. In one implementation, priority selection mechanism 622 may be implemented as one or more bitmasks. In another implementation, priority selection mechanism 622 may be implemented using another technique. High priority set of DWRR pointers 624 may point to queue level nodes associated with a high priority. Low priority set of DWRR pointers 626 may point to queue level nodes associated with a low priority.

Queue level 603 may include one or more queue nodes 630 (referred to herein collectively as "queue nodes 630" and individually as "queue node 630"). For example, as shown in FIG. 6, queue level 630 may include queue nodes 630-A-A to 630-N-K. In the example of FIG. 6, stream node 620-A points to queue nodes 630-A-A to 630-A-K, and queue nodes 630-A-A and 630-A-K are associated with a high priority while queue nodes 630-A-B and 630-A-C are associated with a low priority. Similarly, stream node 620-N points to queue nodes 630-N-A to 630-N-K, and queue node 630-N-A is associated with a high priority and queue nodes 630-N-J and 630-N-K are associated with a low priority. Queue nodes 630 may include pointers to packet notifications that have been enqueued by enqueuer 510 and may be organized in a first-in-first-out manner. Thus, a new packet notification pointer may be placed at the tail of queue node 630 and packet notifications may be popped from queue node 630 from a head of queue node 630.

Although FIG. 6 shows example nodes of scheduling nodes memory 520, in other implementations, scheduling nodes memory 520 may contain fewer nodes, different nodes, additional nodes, or differently arranged nodes than depicted in FIG. 6. Additionally or alternatively, one or more fields of scheduling nodes memory 520 may include information described as being included in one or more other fields of scheduling nodes memory 520. Furthermore, while FIG. 6 shows an implementation with a three level hierarchy (e.g., root node, stream nodes, queue nodes), in another implementation, scheduling nodes memory 520 may include additional, or fewer, node levels.

Figure 7A:
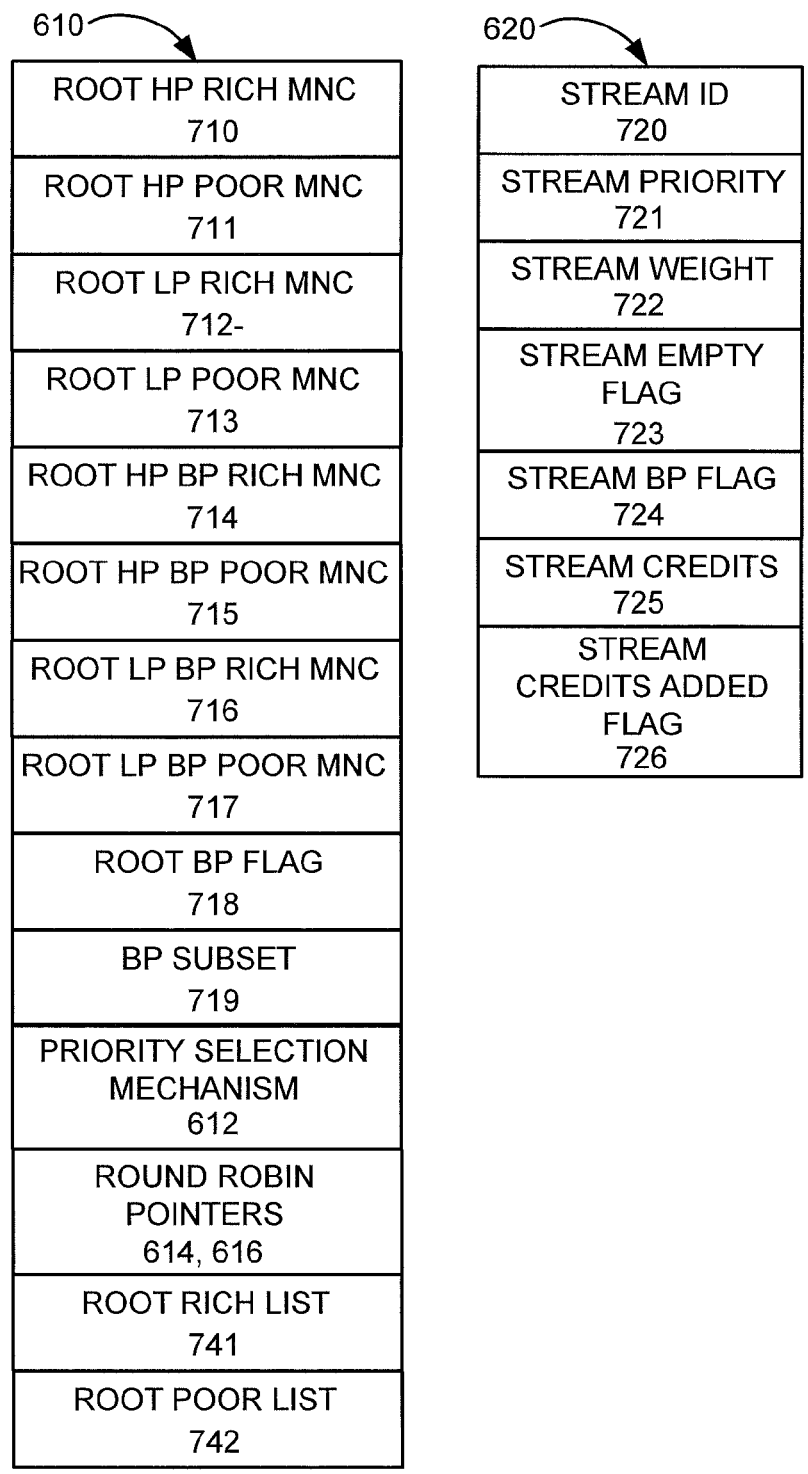
FIG. 7A is a diagram illustrating example fields associated with scheduling nodes according to an implementation described herein.

FIG. 7A is a diagram illustrating example fields associated with root node 610 and stream node 620 of scheduling nodes memory 520 according to an implementation described herein.

As shown in FIG. 7A, root node 610 may include a root high priority (HP) rich MNC field 710, a root HP poor MNC field 711, a root low priority (LP) rich MNC field 712, a root LP poor MNC field 713, a root HP BP rich MNC field 714, a root HP BP poor MNC field 715, a root LP BP rich MNC field 716, a root LP BP poor MNC field 717, a root BP flag 718, a BP subset field 719, priority selection mechanism 612, HP DWRR pointers 614, LP DWRR pointers 616, a root rich list 741, and a root poor list 742.

Root HP rich MNC field 710 may store a value corresponding to the MNC value of rich HP stream nodes 620. Root HP poor MNC field 712 may store a value corresponding to the MNC value of poor HP stream nodes 620. Root LP rich MNC field 712 may store a value corresponding to the MNC value of rich LP stream nodes 620. Root LP poor MNC field 713 may store a value corresponding to the MNC value of poor LP stream nodes 620.

Root HP BP rich MNC field 714 may store a value corresponding to the MNC value of rich backpressured HP stream nodes 620. Root HP BP poor MNC field 715 may store a value corresponding to the MNC value of poor backpressured HP stream nodes 620. Root LP BP rich MNC field 716 may store a value corresponding to the MNC value of rich backpressured LP stream nodes 620. Root LP BP poor MNC field 717 may store a value corresponding to the MNC value of poor backpressured LP stream nodes 620. Root BP flag 718 may store an indication as to whether a subset of scheduling nodes is being backpressured.

BP subset field 719 may identify one or more subsets of one or more stream nodes 620, that may be associated with a particular backpressure condition (e.g., that may be backpressured together in response to the particular backpressure condition). For example, BP subset field 719 may identify a particular subset stored in node subsets memory 550 (e.g., stream nodes 620 associated with local switching ports in a particular chip or fabric card of network element 110). As another example, BP subset field 719 may dynamically updated by backpressure manager 540 whenever backpressure manger determines that a particular scheduling node is to be backpressured.

Root rich list 741 may store a list of stream nodes that are currently rich in credits (e.g., have nonnegative credits). Root poor list 742 may store a list of stream nodes that are currently poor in credits (e.g., have negative credits).

As further shown in FIG. 7A, stream node 620 may include a stream identification (ID) field 720, a stream priority field 721, a stream weight field 722, a stream empty flag field 723, a stream BP flag field 724, a stream credits field 725, and a stream credits added flag field 726.

Stream ID field 720 may include a stream identifier unique for stream node 620. Stream priority field 721 may store an indication of a priority associated with stream node 620 (e.g., whether stream node 620 is a high priority stream node or a low priority stream node). Stream weight field 722 may store a value corresponding to a weight associated with stream node 620. Stream empty flag field 723 may store an indication whether stream node 620 is empty (e.g., an indication that all queue nodes to which stream node 610 points are empty). Stream BP flag field 724 may store an indication whether stream node 620 is backpressured. Stream credits field 725 may store a value corresponding to a quantity of credits currently remaining for stream node 620. Stream credits added flag field 726 may store an indication whether credits have been added to stream node 620 in the current DWRR scheduling round.

Although FIG. 7A shows example fields of root node 610 and stream node 620, in other implementations, root node 610 or stream node 620 may contain fewer fields, different fields, additional fields, or differently arranged fields than depicted in FIG. 7A. Additionally or alternatively, one or more fields of root node 610 or stream node 620 may include information described as being included in one or more other fields of scheduling nodes memory 520.

Furthermore, while, FIG. 7A illustrates one hierarchical level of scheduling nodes (e.g., root node 610 and a stream node 620, which may be a child node of root node 610), the fields and relationships illustrated in FIG. 7A may be extended to any hierarchical level. For example, stream node 620 may include fields corresponding to fields included in root node 610, applied with respect to a child node of stream node 620 (e.g., queue node 630), and the child node (e.g., queue node 630) may include fields corresponding to fields included in stream node 620. If queue node 630 is associated with a further hierarchical level (e.g., queue node 630 include child nodes), the fields and relationships illustrated in FIG. 7A may be further extended with respect to queue node 630 and child nodes of queue nodes 630, etc.

Figure 7B:
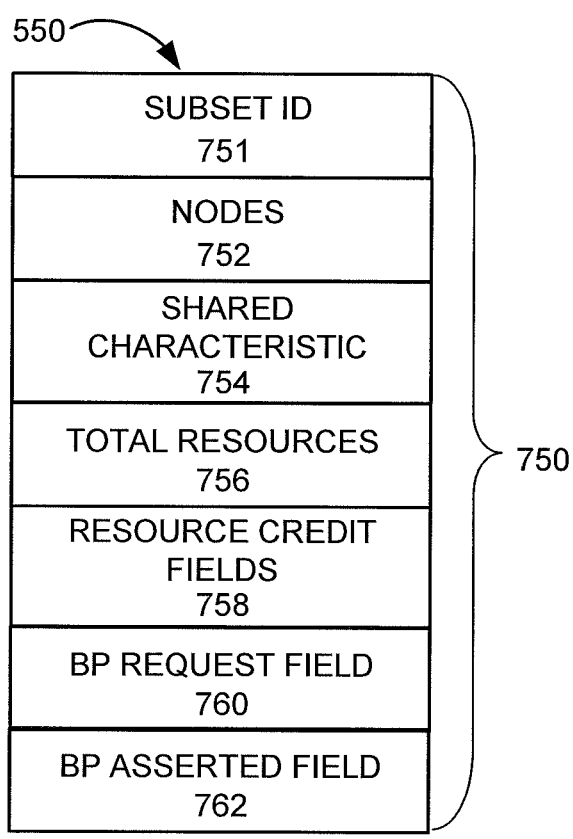
FIG. 7B is a diagram illustrating example fields associated with a queue resources memory according to an implementation described herein.

FIG. 7B is a diagram illustrating example fields associated node subsets memory 550 according to an implementation described herein. As shown in FIG. 7B, node subsets memory 550 may include one or more subset records 750 (referred to herein collectively as "subset records 750" and individually as "subset record 750"). Subset record 750 may include a subset ID field 751, a nodes field 752, a shared characteristic field 754, a total resources field 756, one or more resource credit fields 758, and a BP request field 760.

Subset ID field 751 may include a unique identifier unique for a particular subset of scheduling nodes. Nodes field 752 may store information identifying particular nodes that are included in the particular subset.

Shared characteristic field 754 may store information identifying one or more shared characteristics associated with the particular nodes included in the particular nodes. For example, shared characteristic field 754 may identify the particular nodes as being associated with a same switch (e.g., a set of locally switched nodes); may identify the particular nodes as being associated with a same virtual local area network (VLAN); may identify the particular nodes as being associated with a same physical or logical port; may identify the particular nodes as being associated with a same rate limit; may identify the particular nodes as being associated with a same quality of service (QoS) class; may identify the particular nodes as being associated with a same flow control process; and/or may identify any other shared characteristic that may be used to identify scheduling nodes as being in a same subset.

Total resources field 756 may include a value that corresponds to a total quantity of resources used and/or being used by the particular subset. In one implementation, the total quantity of resources may be based on a sum based on values stored in resource credit fields 758. In another implementation, the total quantity of resources may be determined independently of values stored in resource credit fields 758. The total quantity of resources may be based on a number of bytes of memory dedicated to resources associated with the nodes included in the subset. Additionally or alternatively, the total quantity of resources may be based on processor computation time and/or a quantity of resource credits associated with the nodes included in the subset. If a value stored in total resources field 756 exceeds a particular threshold, backpressure manager 540 may apply backpressure to the particular subset of scheduling nodes.

One or more resource credit fields 758 may include information corresponding to a number of credits, associated with the particular subset or associated with operation of queue manager 410, for a particular resource. A resource that may be tracked and stored in resource credits fields 758 may include look up request credits. Queue manager 410 may issue a particular quantity of unacknowledged notifications to packet processing unit 440, up to a look up request credit limit. When the look up request credits are exhausted for the particular subset of scheduling nodes, backpressure manager 540 may apply backpressure to the particular subset of scheduling nodes. Look up request credits may be replenished after a particular period of time has elapsed and/or after a particular number of DWRR scheduling rounds has occurred.

A resource that may be tracked and stored in resource credits fields 758 may include header-buffer credits. Each packet must allocate a packet header-buffer from a global pool when a packet notification, associated with the packet, is dispatched to packet processing unit 440. The header-buffers may eventually be freed up by a packet reader. When a supply of header-buffer memory space is exhausted, backpressure manager 540 may apply backpressure to the particular subset of scheduling nodes, until a particular quantity of header-buffer memory space is freed up.

A resource that may be tracked and stored in resource credits fields 758 may include a number of outstanding packets for a particular packet stream. If the number of packets for the particular packet stream is greater than a threshold, backpressure manager 540 may apply backpressure to a particular subset of scheduling nodes associated with the particular packet stream.

A resource that may be tracked and stored in resource credit fields 758 may include a total quantity of local switching queue credits. Local switching may refer to switching occurring within a same chip (e.g., a source port and a destination port for a packet are both located on a same local switching fabric). Local switching queue credits may be decremented when queue manager 410 dequeues a packet notification from a node included in the particular subset of scheduling nodes and when the packet, associated with the packet notification, consumes a local switching buffer. When the local switching buffer credits associated with the subset are exhausted, backpressure manager 540 may apply backpressure to the subset. Local switching buffer credits may be incremented by packet processing unit 440 when a packet will not be locally switched, or by a local switching mechanism when a local switching buffer is freed up.

A resource that may be tracked and stored in resource credit fields 758 may include look up reorder buffer credits associated with lookup engine 440. Queue manager 410 may track a number of outstanding packets that may require a reorder buffer in packet processing unit 440. This may guarantee that any packet dispatched to packet processing unit 440 will be able to allocate a reorder buffer. When reorder buffer credits are exhausted, backpressure manager 540 may apply backpressure to a subset of scheduling nodes associated with packet streams which may require a reorder buffer. Reorder buffer credits may be decremented when a packet is dispatched to packet processing unit 440 that may require a reorder buffer, and may be incremented when packet processing unit 440 signals that it has completed processing a packet.

BP request field 760 may include information corresponding to whether a request was received to backpressure the particular subset of scheduling nodes. A request may be received, for example, from a remote interface, indicating that a particular packet stream, associated with the subset, is consuming too many packet resources. The backpressure, applied based on the received request, may be cleared after a particular period of time has elapsed, after a particular number of DWRR scheduling rounds has occurred, and/or based on receiving a signal (e.g., from the remote interface) that backpressure is no longer being requested.

Although FIG. 7B shows example fields of subset record 750, in other implementations, subset record 750 may contain fewer fields, different fields, additional fields, or differently arranged fields than depicted in FIG. 7B.

Figure 8:
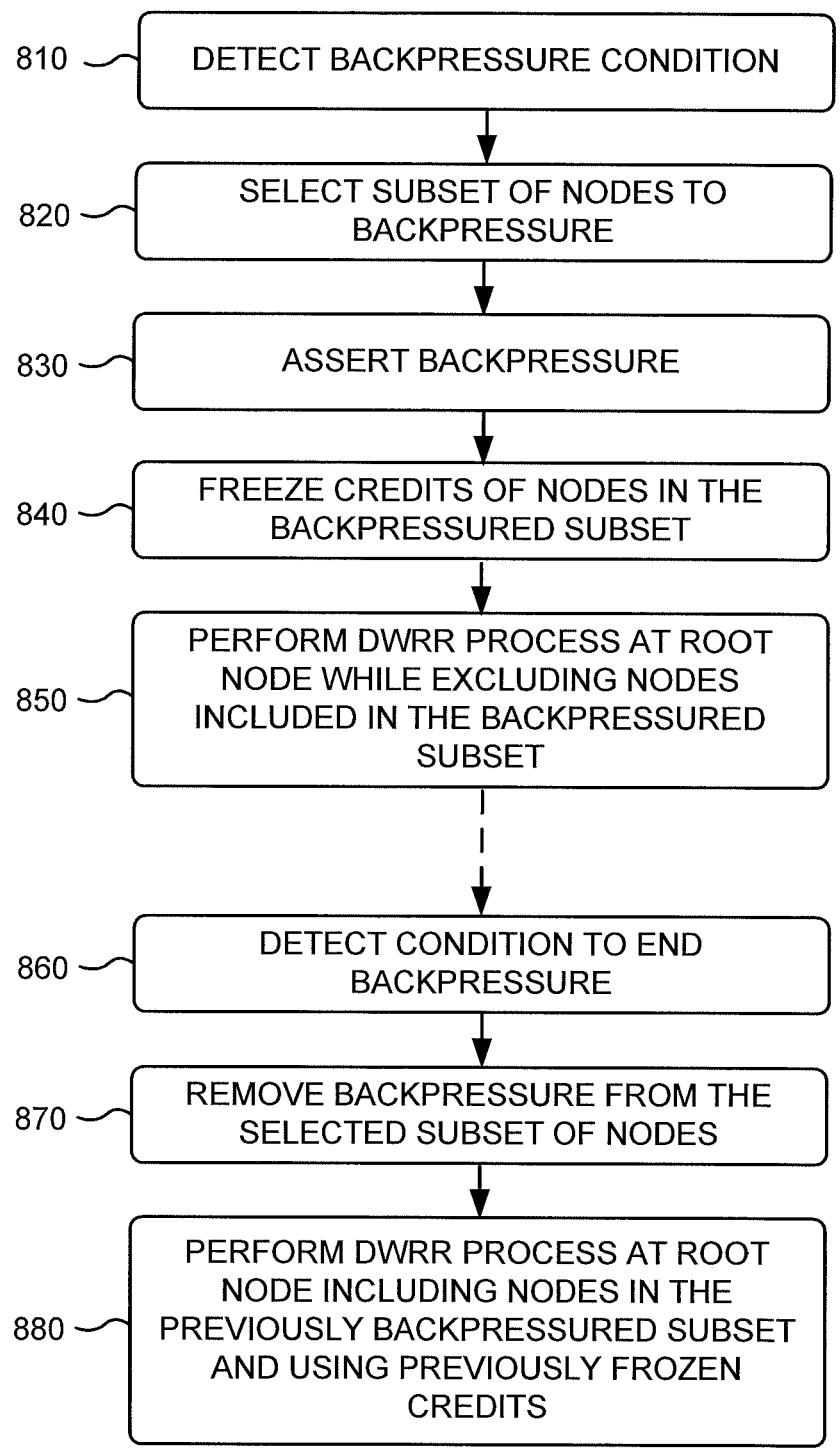
FIG. 8 is a diagram of a flow chart illustrating an example process for backpressuring a scheduling node according to an implementation described herein.

FIG. 8 is a diagram of a flow chart illustrating an example process for backpressuring a scheduling node according to an implementation described herein. In one implementation, the process of FIG. 8 may be performed by network device 110. In other implementations, some or all of the process of FIG. 8 may be performed by another device or a group of devices separate and/or possibly remote from or including network device 110.

The process of FIG. 8 may include detecting a backpressure condition (block 810). For example, backpressure manager 540 may detect that a total quantity of resources, which are being used by a subset of nodes, has exceeded a threshold; that credits associated with a particular resource, associated with a subset of nodes, have been exhausted; and/or that a request has been received to backpressure a subset of nodes. In one example, backpressure manager 540 may access node subsets memory 550 at periodic intervals to determine whether a particular subset of scheduling nodes is to be backpressured. In another example, backpressure manager 540 may receive a request from another component and/or process of network element 110, or from a remote interface, to backpressure a subset of nodes associated with a particular shared characteristic.

A subset of nodes may be selected to be backpressured (block 820). For example, backpressure manager 540 may select a subset of nodes based on the detected backpressure condition. In one implementation, backpressure manager 540 may identify a particular subset of scheduling nodes by identifying the particular subset in queue resource memory 550 based on a shared characteristic associated with the detected backpressure condition (e.g., by accessing shared characteristic fields 754 associated with particular subsets). For example, backpressure manager 540 may identify a subset of scheduling nodes associated with a total quantity of resources higher than a threshold; may identify a subset of scheduling nodes associated with exhausted credits with respect to a particular resource; and/or may identify a subset of scheduling nodes associated with a shared characteristic that is associated with a received request (e.g., a request to backpressure a particular packet stream).

In another implementation, backpressure manager 540 may generate a subset of scheduling nodes by identifying particular scheduling nodes that correspond to the detected backpressure condition. Backpressure manager 540 may create a new entry in node subsets memory 550 based on the generated subset.

Backpressure may be asserted (block 830). For example, backpressure manager 540 may assert backpressure to scheduling nodes associated with the selected backpressure. Backpressure manager 540 may set a backpressure flag associated with scheduling nodes included in the selected subset (e.g., stream BP flag 724 associated with stream nodes 620 included in the selected subset). Additionally, backpressure manager 540 may set root BP flag 718, indicating that backpressure is being applied to a subset of scheduling nodes and may inform scheduler 430 that MNC values associated with backpressured nodes need to be tracked. Furthermore, backpressure manager 540 may store information identifying the backpressured subset (e.g., may store a subset ID associated with subset ID field 751) in BP subset field 719 of root node 610.

Credits of nodes in the backpressured subset may be frozen (block 840). For example, backpressure manager 540 may freeze the value stored in a credit field (e.g., stream credits field 725) of all nodes included in the backpressured subset.

A DWRR process may be performed at the root node with backpressure asserted (block 850). For example, scheduler 430 may perform a DWRR process by tracking MNC values at the root node based on the fact that backpressure is being applied to a subset of scheduling nodes. A DWRR process, being performed while backpressure may be applied to a subset of scheduling nodes, is described below with reference to FIGS. 9A-6C.

At some later time, a condition to end the backpressure may be detected (block 860). For example, backpressure manager 540 may detect that a total quantity of resources, associated with the backpressured subset of nodes, has dropped below the threshold; that credits associated with the particular resource have been replenished; and/or that an indication has been received that the request to backpressure the subset of nodes is withdrawn. In one example, backpressure manager 540 may access node subsets memory 550 at periodic intervals to determine whether credits associated with the particular resource have been replenished. In another example, backpressure manager 540 may receive an indication from the other component and/or process of network element 110, or from the remote interface, to withdraw the previously sent request to backpressure the subset of nodes.

Backpressure may be removed from the selected subset of nodes (block 870). For example, in response to detecting the condition to end the backpressure, backpressure manager 540 may clear the backpressure flag associated with scheduling nodes included in the selected subset (e.g., stream BP flag 724 associated with stream nodes 620 included in the selected subset). Additionally, backpressure manager 540 may clear root BP flag 718. Furthermore, backpressure manager 540 may remove information identifying the backpressured subset from BP subset field 719 of root node 610.

A DWRR process may be performed at the root node including nodes in the previously backpressured subset and using the previously frozen credits (block 880). For example, scheduler 430 may perform a DWRR process by tracking MNC values at the root node based on the fact that no backpressure is being applied to a subset of scheduling nodes. A DWRR process, being performed without backpressure being applied to a subset of scheduling nodes, is described below with reference to FIGS. 9A-6C.

Figure 9A:
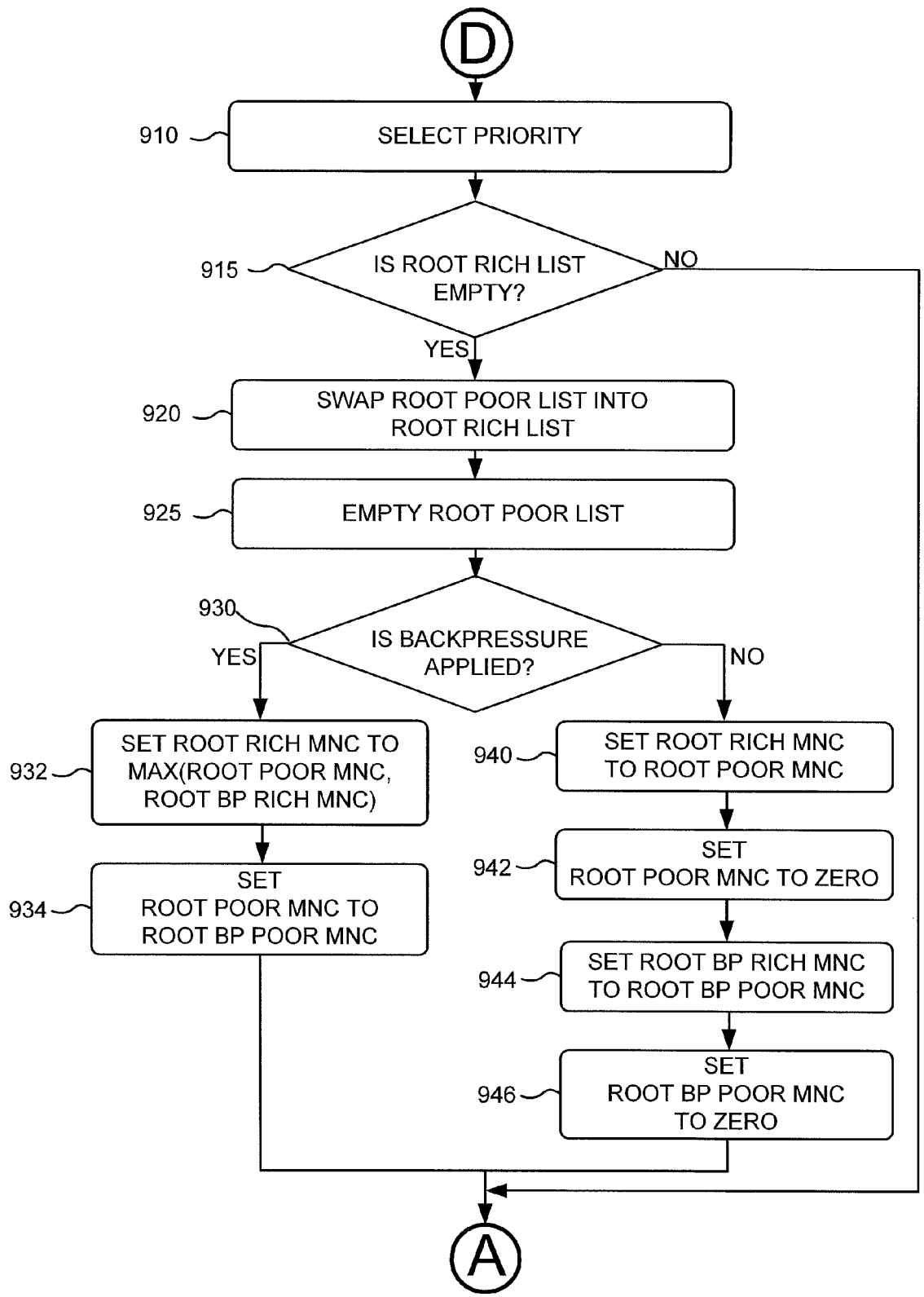
FIGS. 9A-9C are diagrams of a flow chart illustrating a example dequeueing process according to an implementation described herein.
Figure 9B:
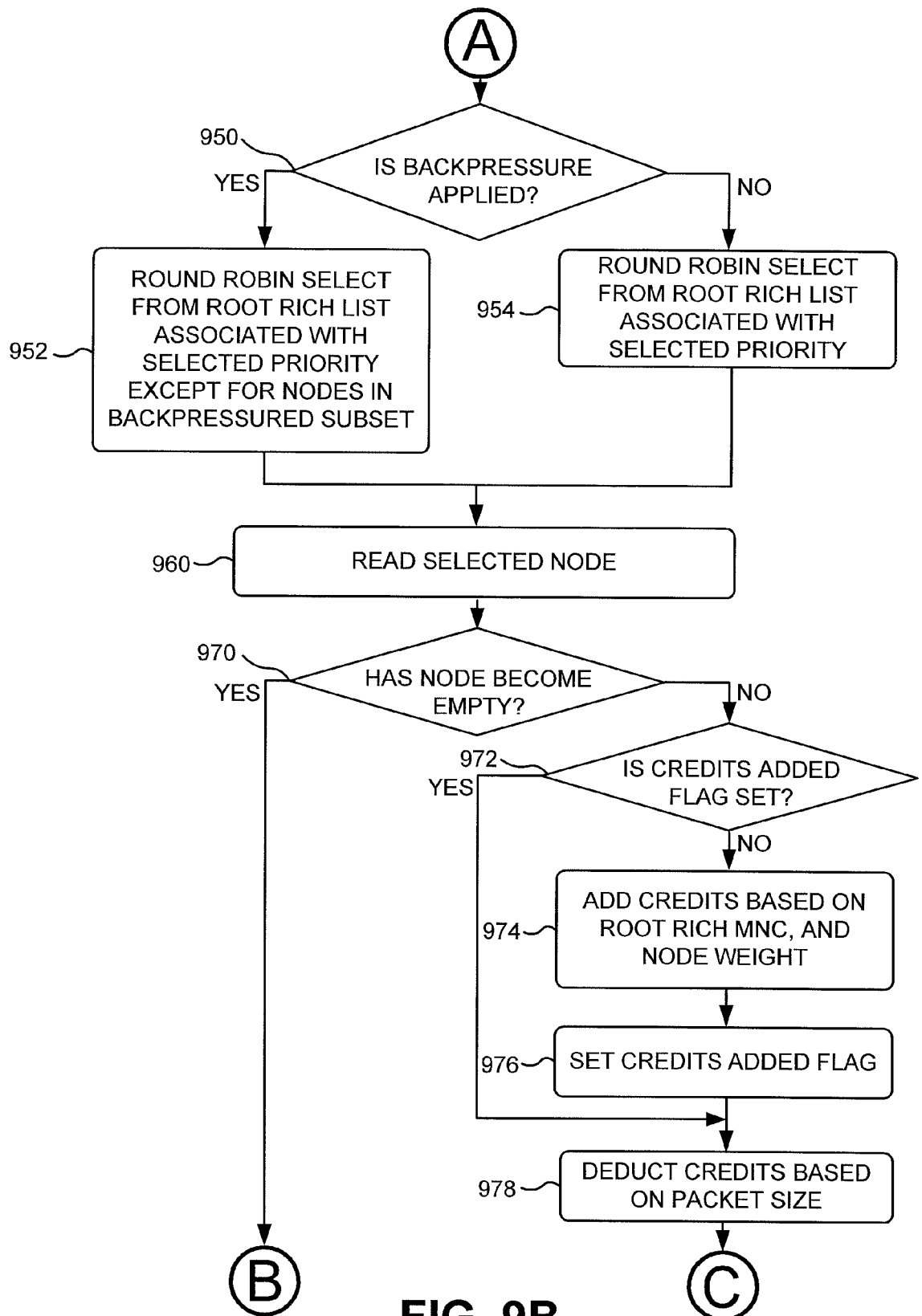
Figure 9C:
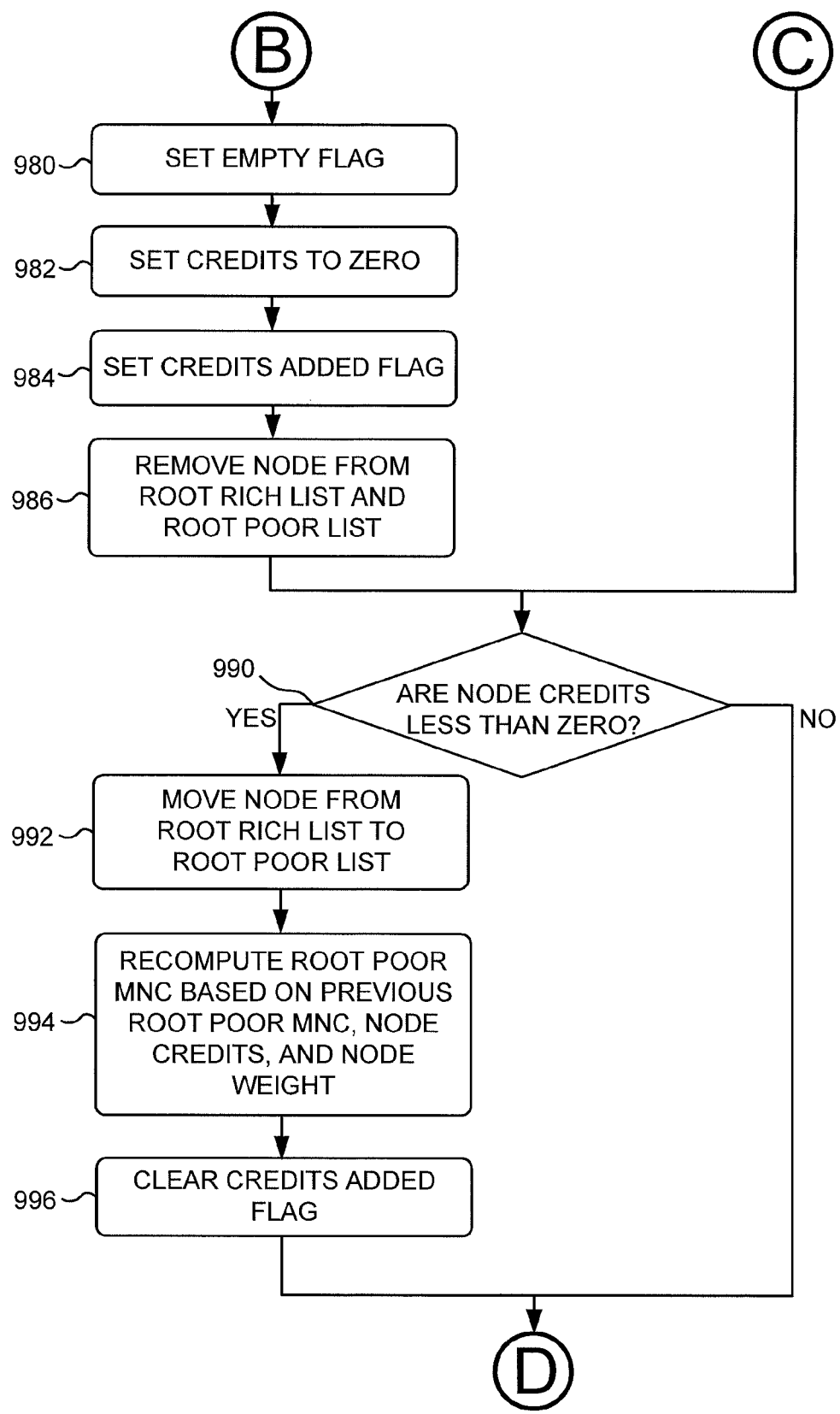

FIGS. 9A-9C are diagrams of a flow chart illustrating an example dequeueing process according to an implementation described herein. In one implementation, the process of FIGS. 9A-9C may be performed by network device 110. In other implementations, some or all of the process of FIGS. 9A-9C may be performed by another device or a group of devices separate and/or possibly remote from or including network device 110.

The process of FIG. 9A may include selecting a priority (block 910). For example, dequeuer 530 may select a priority associated with stream nodes by using priority selection mechanism 612 of root node 610. As an example, dequeuer 530 may use a bitmask to select high priority stream nodes.

A determination may be made whether a root rich list is empty (block 915). For example, dequeuer 530 may check root rich list field 741 to determine whether any scheduling nodes (e.g., stream nodes 620) remain in the rich list. If it is determined that the root rich list is not empty block 915—NO), processing may continue to block 950 of FIG. 9B (e.g., a next child node may be round robin selected).

If it is determined that the root rich list is empty (block 915—YES), the root poor list may be swapped into the root rich list (block 920) and the root poor list may be emptied (block 925). For example, dequeuer 530 may assign scheduling nodes stored in root poor list 742 to root rich list 741 and may empty poor list 742, thereby setting up the scheduling nodes for a new DWRR round.

A determination may be made whether backpressure is being applied to a subset of scheduling nodes (block 930). For example, dequeuer 530 may check root BP flag 718 of root node 610 to determine whether root BP flag 718 has been set.

If it is determined that backpressure is being applied to a subset of scheduling nodes (block 930—YES), the root rich MNC value may be set to a maximum of the root poor MNC value and the root BP rich MNC value (block 932) and the root poor MNC value may be set to the root BP poor MNC value (block 934). For example, if root BP flag 718 has been set, dequeuer 530 may assign a maximum (e.g., the greater of the two values) of the value stored in root HP poor MNC field 711 and the value stored in root HP BP rich MNC field 714 to root HP rich MNC field 710, and may assign the value stored in root HP BP poor MNC field 715 to root HP poor MNC field 711.

Returning to block 930, if it is determined that backpressure is not being applied to a subset of scheduling nodes (block 930—NO), a root rich MNC value may be set to a root poor MNC value (block 940) and the root poor MNC value may be set to zero (block 942). For example, if root BP flag 718 has not been set, dequeuer 530 may assign the value stored in root HP poor MNC field 711 into root HP rich MNC field 710 and may assign a value of zero to root HP poor MNC field 711. A root BP rich MNC value may be set to a root BP poor MNC value (block 944) and the root BP poor MNC value may be set to zero (block 946). For example, if root BP flag 718 has not been set, dequeuer 530 may assign the value stored in root HP BP poor MNC field 715 into root HP BP rich MNC field 714 and may assign a value of zero to root HP BP poor MNC field 715.

Continuing to FIG. 9B, a determination may be made whether backpressure is being applied to a subset of scheduling nodes (block 950). For example, dequeuer 530 may check root BP flag 718 of root node 610 to determine whether root BP flag 718 has been set.

If it is determined that backpressure is being applied to a subset of scheduling nodes (block 950—YES), a scheduling node may be round robin selected from the root rich list, associated with the selected priority, except for nodes included in the backpressured subset (block 952). For example, dequeuer 530 may select a next available stream node 620 from root rich list 741 based on HP DWRR pointers 614 of root node 610. If the next available stream node 620 is included in the backpressured subset (e.g., based on being included in nodes field 752 of subset record 750 identified in BP subset field 719 of root node 610), dequeuer 530 may skip the stream node 620 and may select a next available stream node 620 that is not included in the backpressured subset.

If it is determined that backpressure is not being applied to a subset of scheduling nodes (block 950—NO), a scheduling node may be round-robin selected from a root rich list associated with the selected priority (block 954). For example, dequeuer 530 may select a next available stream node 620 from root rich list 741 based on HP DWRR pointers 614 of root node 610.

The selected scheduling node may be read (block 960). For example, dequeuer 530 may access selected stream node 620, and may perform a dequeueing process with respect to selected stream node 620. The process of FIGS. 9A-9C may be performed recursively at a next lower level of scheduling hierarchy, with root node 610 being replaced by selected stream node 620 and a next available stream node 620 being replaced by a next available queue node 630, associated with the selected stream node 620. The process at a lower hierarchical level may run independently of a process at a higher level. In other words, processing may continue without having to wait for the process of block 960, associated with a dequeuing operation at a lower hierarchical level, to complete.

In one implementation, where applying backpressure of subsets of scheduling nodes is implemented only at root node 610, dequeuer 530 may perform particular blocks of FIGS. 9A-9C with respect to the next lower hierarchical level, without performing other particular blocks of FIGS. 9A-9C. For example, dequeuer 530 may not perform blocks 930, 940, 942, 944, 946, 950, and 952 with respect to the lower hierarchical level (e.g., with selected stream node 620 now acting as a root node).

In another implementation, applying backpressure of subsets of scheduling nodes may be implemented at multiple scheduling levels, and dequeuer 530 may perform the blocks of FIGS. 9A-9C with respect to the next lower hierarchical level, while performing blocks 930, 940, 942, 944, 946, 950, and 952 with respect to the lower hierarchical level (e.g., with selected stream node 620 now acting as a root node). In such an implementation, selected stream node 620 may include fields corresponding to the fields described with respect to root node 610 in FIG. 7A.

Returning to the description of processing at root node 610, a determination may be made whether the selected scheduling node has become empty (block 970). For example, dequeuer 530 may determine whether selected stream node 620, after being read, has become empty, meaning that selected stream node 620 now includes only empty queue nodes 630. If selected stream node 620 includes only empty queue nodes 630, dequeuer 530 may determine that selected stream node 620 has become empty.

If it is determined that the selected scheduling node has become empty (block 970—YES), continuing to FIG. 9C, an empty flag may be set (block 980). For example, dequeuer 530 may set stream empty flag 723 of selected stream node 620. Credits may be set to zero (block 982). For example, dequeuer 530 may assign the value of zero to stream credits field 725 of selected stream node 620. A credits added flag may be set (block 984). For example, dequeuer 530 may set stream credits added flag 726 of selected stream node 620. Assigning zero credits to the stream node and setting the stream credits added flag may ensure that selected stream node 620, having become empty, does not further participate in the DWRR process and does not receive further credits. The scheduling node may be removed from a root rich list and a root poor list (block 986). For example, dequeuer 530 may remove selected stream node 620 from root rich list 741 and from root poor list 742. Processing may continue to block 990.

Returning to block 970 of FIG. 9B, if it is determined that the selected scheduling node has not become empty (block 970—NO), a determination may be made whether the credits added flag is set (block 972). For example, dequeuer 530 may determine whether stream credits added flag 726 of selected stream node 620 has been set. If it is determined that the stream credits added flag has been set (block 972—YES), processing may continue to block 978.

If it is determined that the credits added flag has not been set (block 972—NO), credits may be added based on the root rich MNC value, and a scheduling node weight (block 974). For example, dequeuer 530 may add credits to stream credits field 725 of selected stream node 620 based on a value stored in root HP rich MNC field 710, and based on a value stored in stream weight field 722 of selected stream node 620 (e.g., by multiplying the root rich MNC value by the stream weight). A credits added flag may be set (block 976). For example, dequeuer 530 may set stream credits added flag 726 of selected stream node 620 to indicate that credits have been added to selected stream node 620.

Credits may be deducted based on packet size (block 978). For example, dequeuer 530 may deduct a value corresponding to the packet size of the packet dequeued from a particular queue node, which is a child of selected stream node 620, from the value stored in stream credits field 725 of selected stream node 620.

Continuing to FIG. 9C, a determination may be made whether scheduling node credits are less than zero (block 990). For example, dequeuer 530 may check whether the value stored in stream credits field 725 of selected stream node 620 is less than zero. If it is determined that stream credits are not less than zero (block 990—NO), processing may return to block 910. For example, dequeuer 530 may continue the process of FIGS. 9A-9C by selecting low priority stream nodes.

If it determined that scheduling node credits are less than zero (block 990—YES), the scheduling node may be moved from a root rich list to a root poor list (block 992). For example, dequeuer 530 may move selected stream node 620 from root rich list 741 to root poor list 742. A root poor MNC value may be recomputed based on a previous root poor MNC value, scheduling node credits, and scheduling node weight (block 994). For example, dequeuer 530 may compare the value stored in root HP poor MNC field 711 with the value stored in stream credit field 725 of selected stream node 620, adjusted based on the value stored in stream weight field 722 of selected stream node 620, to determine whether the value is greater than the current root HP poor MNC value. If the credits of stream node 620 were depleted more than the current root HP poor MNC value, dequeuer 530 may replace the current root HP poor MNC value with the new value based on the value stored in stream credits 725 of selected stream node 620. A credits added flag may be cleared (block 996). For example, dequeuer 530 may clear stream credits added flag 726 of selected stream node 620. Processing may return to block 910. For example, dequeuer 530 may continue the process of FIGS. 9A-9C by selecting low priority stream nodes.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 8 and 9A-9C, the order of the blocks may be modified in other implementations. Further, non-dependent blocks may be performed in parallel.

Also, certain portions of the implementations may have been described as a "component," "manager," "mechanism," "scheduler," "enqueuer," or "dequeuer" that performs one or more functions. The "component," "manager," "mechanism," "scheduler," "enqueuer," and "dequeuer" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A method comprising:

determining, by a device, that a subset of scheduling nodes is being backpressured;

setting, by the device and after determining that the subset of the scheduling nodes is being backpressured, a first value to a maximum of a second value or a third value associated with the subset of the scheduling nodes;

setting, by the device and after determining that the subset of the scheduling nodes is being backpressured, the second value to match a fourth value associated with the subset of the scheduling nodes; and replenishing, by the device and based on at least one of the first value or the second value, credits associated with the subset of the scheduling nodes.

2. The method of claim 1, where the first value corresponds to a measure of how many credits will replenish the scheduling nodes to a nonnegative value of credits based on a previous round of a deficit weighted round robin process.

3. The method of claim 1, where the second value corresponds to a measure of how many credits will replenish the scheduling nodes to a nonnegative value of credits based on a current round of a deficit weighted round robin process.

4. The method of claim 1, where the third value corresponds to a measure of how many credits will replenish the scheduling nodes in the subset to a nonnegative value of credits based on a previous round of a deficit weighted round robin process.

5. The method of claim 1, where the fourth value corresponds to a measure of how many credits will replenish the scheduling nodes in the subset to a nonnegative value of credits based on a current round of a deficit weighted round robin process.

6. The method of claim 1, further comprising:

determining that another subset of scheduling nodes is not being backpressured; and setting the first value to the second value based on determining that the other subset of scheduling nodes is not being backpressured.

7. The method of claim 1, further comprising:

determining that another subset of scheduling nodes is being backpressured; and setting the second value to zero based on determining that the other subset of scheduling nodes is being backpressured.

8. The method of claim 1, further comprising:

dequeue packets from the scheduling nodes in a deficit weighted round robin (DWRR) process.

9. The method of claim 8, determining that a particular node is included in the subset of the scheduling nodes that is being pressured, the particular node not being read during the DWRR process based on the particular node being included in the subset of the scheduling nodes.

10. A system comprising:

one or more processors to:

determine that a subset of scheduling nodes is being backpressured;

set a first value to a maximum of a second value or a third value based on determining that the subset of scheduling nodes is being backpressured, the second value and the third value being associated with the subset of scheduling nodes;

set the second value to match a fourth value based on determining that the subset of scheduling nodes is being backpressured, the fourth value being associated with the subset of scheduling nodes; and replenish credits associated with the subset of scheduling nodes based on at least one of the first value or the second value.

11. The system of claim 10, where the first value is a root rich most negative credits value associated with a root node of the scheduling nodes, and where the second value is a root poor most negative credits value associated with the root node.

12. The system of claim 10, where the third value is a root backpressured rich most negative credits value associated with the subset of scheduling nodes, and where the fourth value is a root backpressured poor most negative credits value associated with the subset of scheduling nodes.

13. The system of claim 10, where the one or more processors are to:

select a priority by using a priority selection mechanism of a root node of the scheduling nodes; and dequeue packets from the scheduling nodes based on the priority.

14. The system of claim 10, where, when determining that the subset of scheduling nodes is being backpressured, the one or more processors are to:

determine that the subset of scheduling nodes is being backpressured when:

a use of a particular resource associated with the subset exceeds a first threshold, a total amount of resources used by the subset exceeds a second threshold, or a request is received to backpressure the subset.

15. The system of claim 10, where, when determining that the subset of the scheduling nodes is being backpressured, the one or more processors are to:

determine that a list associated with the subset of the scheduling nodes is empty, the list being for scheduling nodes associated with non-negative credits, and determine that the subset of scheduling nodes is being backpressured based on the list being empty.

16. A method comprising:

determining, by a device, that a subset of a set of scheduling nodes is not being backpressured;

selecting, by the device and after determining that the subset is not being backpressured, a particular scheduling node from a first list associated with the set of scheduling nodes, the first list including scheduling nodes associated with non-negative credits;

reading, by the device, the particular scheduling node;

determining, by the device, that a quantity of credits associated with the particular scheduling node is less than zero; and moving, by the device and after determining that the quantity of credits associated with the particular scheduling node is less than zero, the particular scheduling node from the first list to a second list associated with the set of scheduling nodes, the second list including scheduling nodes associated with negative credits.

17. The method of claim 16, further comprising:
computing a particular value based on the quantity of credits associated with the particular scheduling node and a weight associated with the particular scheduling node; and
replenishing the quantity of credits associated with the particular scheduling node based on the particular value.

18. The method of claim 17,
where the particular value is a new root poor most negative credits (MNC) value, and
where the particular value is computed further based on a previous root poor MNC value.

19. The method of claim 16, further comprising:
selecting another scheduling node from the first list based on the subset not being backpressured;
reading the other scheduling node;
determining the other scheduling node is empty as a result of reading the other scheduling node; and
removing the other scheduling node from the first list and from the second list based on determining that the other scheduling node is empty.

20. The method of claim 16, further comprising:
selecting another scheduling node from the first list based on the subset not being backpressured;
reading the other scheduling node;
dequeueing a packet based on reading the other scheduling node; and
deducting another quantity of credits from credits associated with the other scheduling node based on a size of the packet.

* * * * *